3,103,764
CROP AND PLANT PROTECTING STRUCTURE
Hans H. A. Heuer, General Delivery, Miami, Fla.
Filed Sept. 7, 1961, Ser. No. 136,582
1 Claim. (Cl. 47—29)

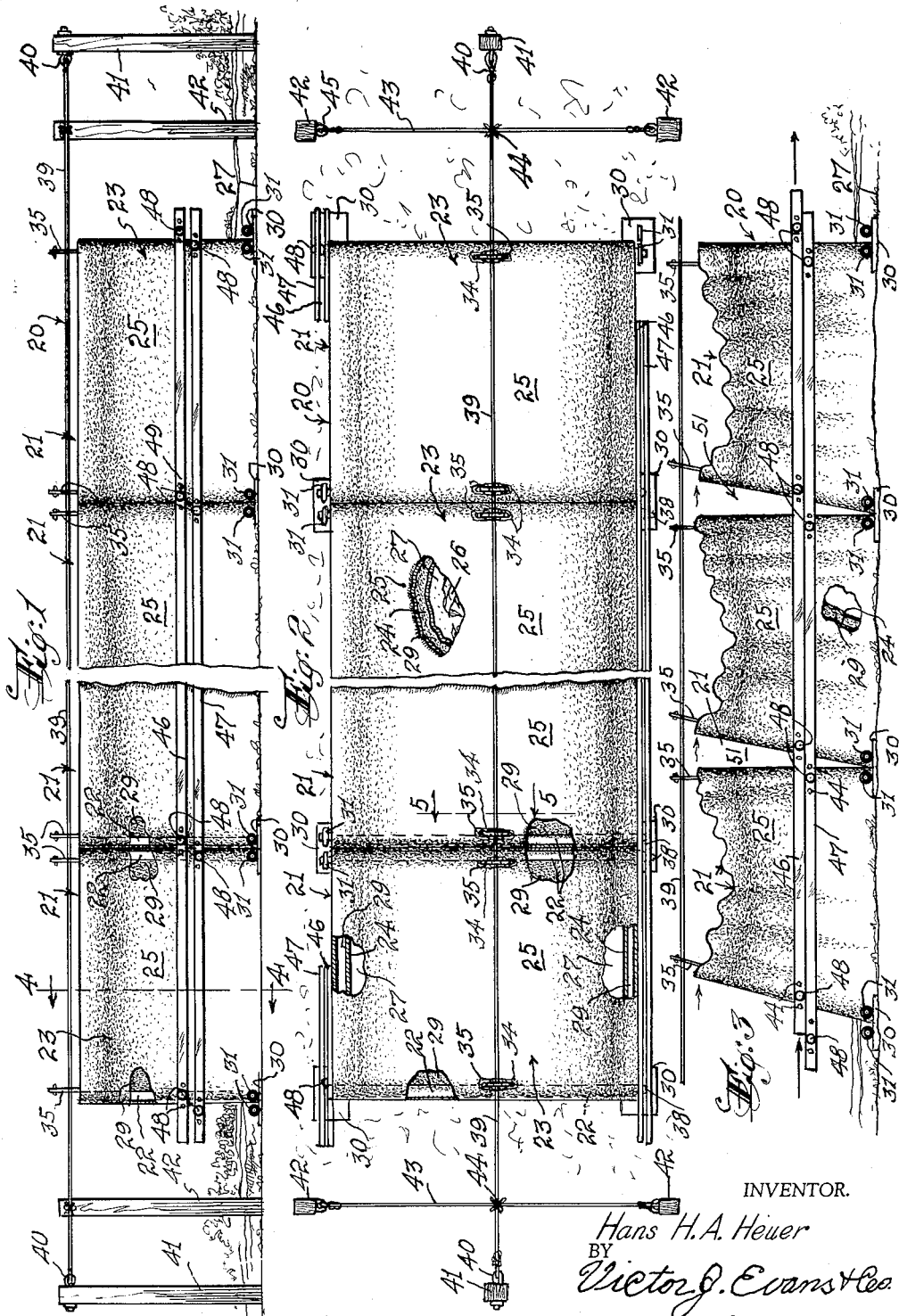
Sept. 17, 1963  H. H. A. HEUER  3,103,764
CROP AND PLANT PROTECTING STRUCTURE
Filed Sept. 7, 1961  2 Sheets-Sheet 1
INVENTOR.
Hans H. A. Heuer
BY Victor J. Evans & Co.
ATTORNEYS.

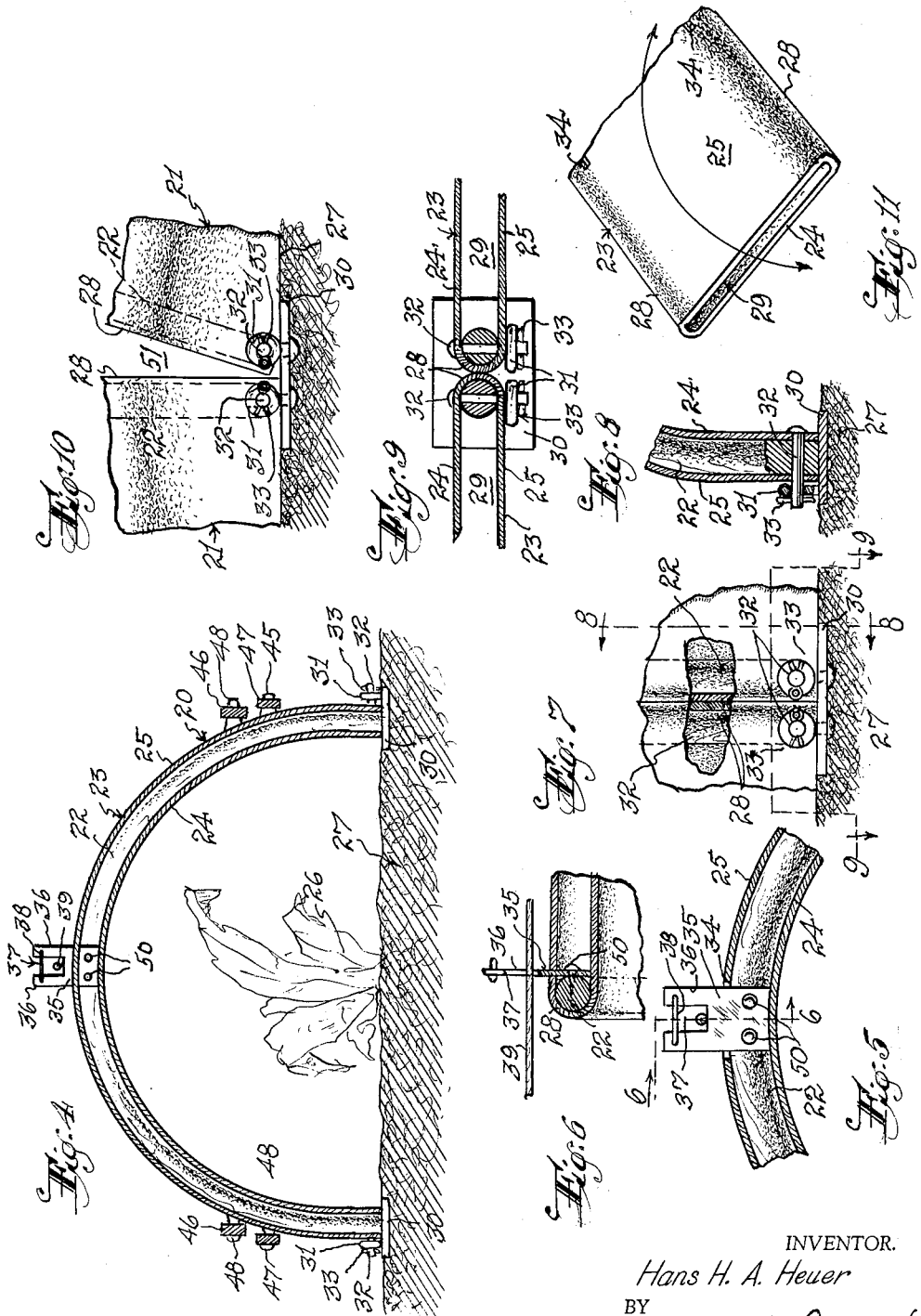

This invention relates to a structure for protecting growing crops, plants or the like.

The primary object of the present invention is to provide a structure that is adapted to be used for mounting over growing plants, vegetables, flowers or the like so that such growing crops will be protected from adverse weather conditions such as frost, excessive heat from the sun or other undesirable conditions.

A further object is to provide a device of the character described which can be adjusted as desired or required so as to insure that the plants or crops will be adequately and properly ventilated, and wherein the parts can be adjusted to compensate for wear that occurs due to aging or climatic influences.

Still another object is to provide such a structure that is economical to manufacture and efficient in operation and which is rugged in structure and foolproof in use.

These and other objects of the invention will become apparent from a reading of the following specification and claim, together with the accompanying drawings, wherein like parts are referred to and indicated by like reference characters and wherein:

FIGURE 1 is a side elevational view of the protective structure constructed according to the present invention, and with parts broken away.

FIGURE 2 is a top plan view, with parts broken away.

FIGURE 3 is an enlarged side elevational view, showing the units adjusted to permit ventilation of the interior of the structure.

FIGURE 4 is a sectional view taken on the line 4—4 of FIGURE 1.

FIGURE 5 is a sectional view taken on the line 5—5 of FIGURE 2.

FIGURE 6 is a sectional view taken on the line 6—6 of FIGURE 5.

FIGURE 7 is a fragmentary sectional view showing certain constructional details of the present invention, and with parts broken away and in section.

FIGURE 8 is a sectional view taken on the line 8—8 of FIGURE 7.

FIGURE 9 is a sectional view taken on the line 9—9 of FIGURE 7.

FIGURE 10 is a view generally similar to FIGURE 7 but showing the parts in adjusted or separated position.

FIGURE 11 is a fragmentary perspective view showing one of the body members or covers for a unit.

Referring in detail to the drawings, the numeral 20 indicates the plant or crop protective structure of the present invention in its entirety which is shown to comprise a plurality of generally similar units 21, and as shown in the drawings, each unit 21 includes a pair of arches 22, and the units 21 are semi-circular or semi-cylindrical in cross section, FIGURE 4. Each unit 21 embodies a film of transparent plastic which is shaped to form a body member 23, and the body member 23 includes inner and outer layers or wall sections 24 and 25 which define or have an air space 29 therebetween. As shown in FIGURE 4 the structure 20 is adapted to be used for protecting plants or crops 26 which are growing in the ground 27. In FIGURE 11 there is illustrated in perspective a portion of one of the body members 22, wherein it will be seen that the body members have an integral or one piece seamless construction so that the inner and outer wall portions or layers 24 and 25 are interconnected or joined by wall sections 28.

The present invention further includes a plurality of spaced apart foot plates 30 which are arranged on the ground, and each foot plate has a pair of eyes or elements 31 secured thereto or formed integral therewith, and there is provided pivot pins 32 which extend through the lower end portions of the arches 22, and the pins 32 also extend through the elements 31 and are retained in place by cotter pins or keys 33, FIGURE 8.

Each of the body members 23 may be provided with slots or cutouts 34, and the numeral 35 indicates plates or forks which extend through the slots 34 in the outer layer 25, FIGURE 6, and the forks 35 are adapted to be secured to the summit of the corresponding arch 22 as for example by means of securing elements 50, and as shown in FIGURE 4 for example, each of the forks 35 includes a pair of spaced parallel vertically disposed tines 36 which define or provide a space 37 between, and horizontally disposed lock wires 38 extend between the upper portions of the tines 36 and are suitably affixed thereto. The numeral 39 indicates a horizontally disposed guide wire which extends between the tines 36, and the guide wire 39 extends below the lock wires 38, and the ends of the guide wire 39 are adapted to be anchored as at 40 to the upper portions of vertically disposed posts 41, and the posts 41 are adapted to be suitably mounted or anchored in the ground 27.

There is further provided vertically disposed spaced parallel posts or standards 42 which are suitably arranged so that their lower portions are embedded or anchored in the ground 27, and the standards 42 have branch wires 43 anchored thereto as at 45, and the branch wires 43 are connected to or arranged in engagement with the guide wire 39 as at 44, FIGURE 2, for a purpose to be later described.

There is further provided a manually operable means for adjusting the units 21, and this means comprises a pair of independently adjustable horizontally disposed push rods or bars 46 and 47 which are connected in a unique manner to certain of the arches 22 as for example by means of the securing elements or studs 48. A plurality of apertures or openings 49 are adapted to be provided in the rods 46 and 47 whereby the securing elements 48 can be extended through different of these apertures in order to provide an adjustment mechanism or means.

From the foregoing, it is apparent that there has been provided a protective device which is especially suitable for use in conjunction with growing plants, crops or the like, and wherein the present invention is adapted to be used for promoting growth of such plants and protecting the plants or crops from adverse weather conditions such as frost, freezing conditions, excessive heat or the like. The present invention consists of a tunnel-shaped or semi-cylindrical housing 20 which is made up of a plurality of similar units 21 that are arranged in end to end relation with respect to each other, and the number of these units being used can vary as desired or required.

The units 21 each consist of the body member 23 which is adapted to be made of a suitable transparent plastic material and the interior of each body member 23 is hollow so as to define or provide an air space which is indicated by the numeral 29, and this air space 29 functions as insulation to help offer increased protection for the plants 26 growing in the ground 27. The body member 23 is adapted to be made of transparent material so as to permit the sun rays to penetrate through the material 23 in order to help promote growth of the plants 26. In certain instances the material 23 may be made opaque to help offer protection from excessive heat from the rays of the sun. Since the body members 23 are made of flexible plastic material, they can be readily shaped to the desired configuration, and for example when the parts are in their proper assembled position, the arches 22 are extended through the opposite end portions of the body member 23, so that each body member 23 has a pair of arches 22 extended therethrough, and these arches are arranged contiguous to the wall portions 28 as shown in the drawings. These arches help maintain the units in their proper position during the use of the present invention. The lower ends of the arches 22 are pivotally connected to the foot plates 30 by means of the pins 32 which extend through the lower ends of the arches and through the elements 31 on the foot plates 30, and the cotter keys 33 are adapted to be used for maintaining the pins 32 in place. Due to the provision of the pivot mounting pins 32, the parts can be arranged in closed position relative to each other as for example as shown in FIGURES 1 and 2, or else the units can be pivoted to an opened position so as to define or provide the spaces 51 between or adjacent the units whereby air can enter the interior of the housing through the spaces 51 for ventilation purposes. Thus, the parts can be moved from the closed positions of FIGURES 1 and 2 to an opened position such as that shown in FIGURES 3 and 10 to provide the spaces 51 when desired or required.

There is further provided a means for opening and closing the units to control the size of the ventilating spaces 51 or to close off the ventilating spaces or enlarge the same, and this means comprises a pair of manually operable push rods 46 and 47 which are connected by means of the studs or securing elements 48 to the arches 22. The push rods 46 and 47 are provided with a plurality of contiguous apertures or openings 49 so that the securing elements 48 can be extended through different of these openings 49 as for example when it is desired to make an adjustment in this control mechanism.

The slots 34 in the upper or outer layers of the body members 23 have the forks 35 extended therethrough, and these forks 35 are secured as at 50 to the summit of the arches, and the guide wire 39 extends through the spaces 37 and below the lock wires 38, and the wire 39 is anchored as at 40 to the upper ends of the posts 41. There is further provided the branch wires 43 which are connected as at 44 to the guide wires 39, and the branch wires 43 are anchored or connected as at 45 to the standards or posts 42.

The parts can be made of any suitable material and in different shapes or sizes.

It will be seen therefore that according to the present invention there has been provided a movable plant growing structure made of plastic film, and which is of an economical effective construction and which is highly heat retaining, easy to ventilate, storm resistant, and space saving in storage or shipment. The device consists of units which are adapted to be joined together to form a continuous tunnel, and each unit consists of two arches 22 over which is slipped a section 23 of plastic film in the shape of collapsed hose of large diameter, so that a double covering is formed with an inner and outer layer 24 and 25 respectively, and wherein there is an air space 29 between both layers, the member 23 being of one seamless piece. The lower ends of the arches are affixed pair wise by hooks or pins 32 to the foot plates 30, and each arch 22 carries at its summit a fork 35, and between the tines 36 of the forks there extends the guide wire 39 which is stretched between the posts 41. The lock wires 38 are attached to prevent the forks from slipping off of the guide wire 39. The branch wires 43 may be attached to other posts or standards 42 in order to prevent the guide wire 39 from being pushed out of its straight shape by lateral wind pressure.

Each arch 22 has on each side a stub or securing element 48 and each arch 22 has these stubs at a different height from the adjoining arch. Two push and pull rods 46 and 47 are connected to the stubs 48, one above the other in such a manner, so that when one rod 46 or 47 is pushed or pulled while the other one is held fixed, the distance between the summit of the arches 22 is changed to provide the ventilation spaces 51, on one side or both sides or this can be used for closing the tunnel tight as desired or required.

In the event that the plastic film changes its dimensions from aging or climatic influence, the tension may be adjusted by sliding the foot plates 30 on the surface of the ground and correcting the fitting of the rods 46 and 47 on the stubs 48 due to the provision of the plurality of openings 49.

The foot plates may be made of wood, metal or the like, and the pivot mounting between the arches and foot plates is adapted to be of a simple rugged construction and consists of the pins 32 which extend through the eye members 31 and which are held in place by cotter pins 33.

The outer end portions or extremities of the structure 20 may be closed by a board fence or the like which would not be part of the present invention.

The spaces 37 provide sufficient clearance to permit the arches to incline downward, as for example when the ventilation spaces are being provided.

The forks are attached to the inside of the arches at the summit thereof. Each unit consists of two arches and one covering with an inside layer and an outside layer, and the covering is of one piece or integral formation. Since the forks are mounted on the upper inner surface of the arches, the units will close tightly. Since the inner and outer layers are of integral or one piece construction, the device can be readily assembled or disassembled with a minimum effort in a short period of time and this is important from the standpoint of the user.

Minor changes in shape, size and rearrangement of details coming within the scope of the invention claimed may be resorted to in actual practice, if desired.

What is claimed is:

A plant protective structure comprising a plurality of pairs of upright rigid arches, each pair of arches being arranged in axial opposed abutting realtion so as to provide a row of pairs of arches having spaced first and second ends, a foot plate adjacent to each end of said arches, each of said plates being adapted to rest upon a ground surface, means pivotally connecting each end of each arch to the adjacent plate, a cover extending between said arches of each pair, said cover being formed integrally as a tube and receiving therein said arches of each pair for support of said cover and defining there within an insulating air space, means on each arch at the midpart thereof for attachment of an overhead support wire, a horizontally disposed first rod extending along and exteriorly of each of said pair of arches, a second rod arranged in superimposed relation with respect to said first rod extending along said pairs of arches, means pivotally connecting said first rod to one arch of each pair of arches, and other means pivotally connecting said second rod to the other arch of each pair of arches whereby linear movement of said second rod relative to said first rod shifts the arch of each pair of arches adjacent said other end of said row from the upright position to an inclined position.

References Cited in the file of this patent

UNITED STATES PATENTS

| 11,153 | Cross | June 27, 1854 |
| 707,247 | Merriman | Aug. 19, 1902 |
| 1,063,502 | Bryan | June 3, 1913 |
| 1,081,482 | Barrott | Dec. 16, 1913 |
| 2,097,972 | Fischer | Nov. 2, 1937 |
| 2,854,948 | Drayson | Oct. 7, 1958 |

FOREIGN PATENTS

| 865,445 | Australia | Apr. 19, 1961 |